(12) United States Patent
Berde

(10) Patent No.: US 8,832,705 B1
(45) Date of Patent: Sep. 9, 2014

(54) ORDERED MUTUAL EXCLUSION

(75) Inventor: Pankaj Vishwanath Berde, Cupertino, CA (US)

(73) Assignee: EMC Corporation, Hopkinton, MA (US)

( * ) Notice: Subject to any disclaimer, the term of this patent is extended or adjusted under 35 U.S.C. 154(b) by 1488 days.

(21) Appl. No.: 11/322,174

(22) Filed: Dec. 28, 2005

(51) Int. Cl.
*G06F 9/46* (2006.01)
*G06F 15/173* (2006.01)

(52) U.S. Cl.
USPC ........................... 718/104; 718/102; 709/226

(58) Field of Classification Search
USPC ................................ 718/100, 102, 104, 106
See application file for complete search history.

(56) References Cited

U.S. PATENT DOCUMENTS

| | | | | |
|---|---|---|---|---|
| 5,706,515 | A * | 1/1998 | Connelly et al. | 718/106 |
| 5,866,890 | A * | 2/1999 | Neuner | 235/381 |
| 6,173,307 | B1 * | 1/2001 | Drews | 718/102 |
| 6,272,517 | B1 * | 8/2001 | Yue et al. | 718/102 |
| 6,374,285 | B1 * | 4/2002 | Scales et al. | 718/104 |
| 6,449,614 | B1 * | 9/2002 | Marcotte | 1/1 |
| 6,735,613 | B1 * | 5/2004 | Jean-Dominique et al. | 718/104 |
| 6,910,211 | B1 * | 6/2005 | Wilhelm, Jr. | 718/104 |
| 7,058,948 | B2 * | 6/2006 | Hoyle | 718/104 |
| 7,100,161 | B2 * | 8/2006 | Latour | 718/102 |
| 7,194,567 | B2 * | 3/2007 | Ogilvie et al. | 710/310 |
| 7,299,264 | B2 * | 11/2007 | Yang-Huffman | 709/208 |
| 7,596,713 | B2 * | 9/2009 | Mani-Meitav et al. | 714/6.32 |
| 7,996,843 | B2 * | 8/2011 | Van Der Veen | 718/104 |
| 2002/0052931 | A1 * | 5/2002 | Peiffer et al. | 709/218 |
| 2002/0138544 | A1 * | 9/2002 | Long | 709/107 |
| 2002/0143960 | A1 * | 10/2002 | Goren et al. | 709/229 |
| 2003/0005263 | A1 * | 1/2003 | Eickemeyer et al. | 712/218 |
| 2003/0084164 | A1 * | 5/2003 | Mazzitelli | 709/227 |
| 2004/0024855 | A1 * | 2/2004 | Tsai et al. | 709/223 |
| 2004/0221059 | A1 * | 11/2004 | Bush | 709/238 |
| 2005/0038836 | A1 * | 2/2005 | Wang | 707/204 |
| 2005/0076335 | A1 * | 4/2005 | Cavage et al. | 718/100 |
| 2005/0135352 | A1 * | 6/2005 | Roe et al. | 370/389 |
| 2005/0157865 | A1 * | 7/2005 | Yeager et al. | 379/266.06 |
| 2005/0172093 | A1 * | 8/2005 | Jain | 711/162 |
| 2006/0010451 | A1 * | 1/2006 | Lenk | 718/105 |
| 2006/0136915 | A1 * | 6/2006 | Aingaran et al. | 718/100 |
| 2007/0006232 | A1 * | 1/2007 | Bliss | 718/100 |
| 2008/0114882 | A1 * | 5/2008 | Christenson | 709/228 |
| 2009/0307696 | A1 * | 12/2009 | Vals et al. | 718/102 |

* cited by examiner

*Primary Examiner* — Meng An
*Assistant Examiner* — Tammy Lee
(74) *Attorney, Agent, or Firm* — Van Pelt, Yi & James LLP

(57) ABSTRACT

Ordered mutual exclusion is disclosed. A place in line to access a shared computing resource is obtained. In some embodiments the place in line is obtained by obtaining a globally unique place identifier. An indication is received that the shared computing resource is available to a specific next resource user. It is determine whether the place in line corresponds to the next resource user.

16 Claims, 3 Drawing Sheets

ORDERED MUTUAL EXCLUSION

BACKGROUND OF THE INVENTION

Systems with shared computing resources often require resource allocation and control. Current resource management schemes typically use locks to guarantee exclusive access to resources. For example, mutex, a system primitive for resource locking, is available in computer operating systems such as Windows and POSIX. Multiple threads can request for a mutex associated with a shared resource. The operating system assigns the mutex to the thread with the highest priority, which will gain exclusive access to the resource. Once the highest priority thread completes, the mutex is reassigned to the next highest priority thread and so on.

The priority based scheme can sometimes lead to thread starvation. The effect is especially pronounced in some systems that allow automatic priority adjustment. In some systems, if a first thread is holding a mutex and a second higher priority thread is waiting for the same mutex, the first thread will inherit the higher priority of the waiting thread. If the high priority threads take a long time to complete, any thread that has lower priority will be starved. To alleviate the thread starvation problem, some systems may automatically drop the priority of the thread holding a mutex, which can lead to repeated cycling between lower and higher priority and even deadlock. Also, in some circumstances it is important that requests to use a shared resource, such as a critical portion of code, be serviced in the order received, as opposed to based on the (potentially inherited) priority of the respective requesting threads.

Therefore, there is a need for a way to provide access to a shared computer resource, such as a critical section of code, that does not suffer from the priority inheritance, starvation, and deadlock problems that can arise when a mutex or similar locking mechanism is used and which can ensure that requests are serviced in the order received.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Managing access to a shared computing resource is disclosed. The techniques disclosed are applicable to an environment with a plurality of resource users each requires exclusive, e.g., serial, access to a shared computing resource. In some embodiments, a resource user waiting to access the shared resource obtains a unique data value that represents its place in line to use the shared resource, and waits for an indication that the shared resource is available to a next one of the plurality of resource users. If the waiting resource user is the next resource user to which the shared resource is available, the waiting resource user proceeds to access the shared resource exclusively. Otherwise, the next resource user accesses the shared resource exclusively and releases the resource when done. Another indication that the shared resource is available is made. The waiting resource user continues to check the indication and waits for its turn to access the shared resource.

Figure 1A:
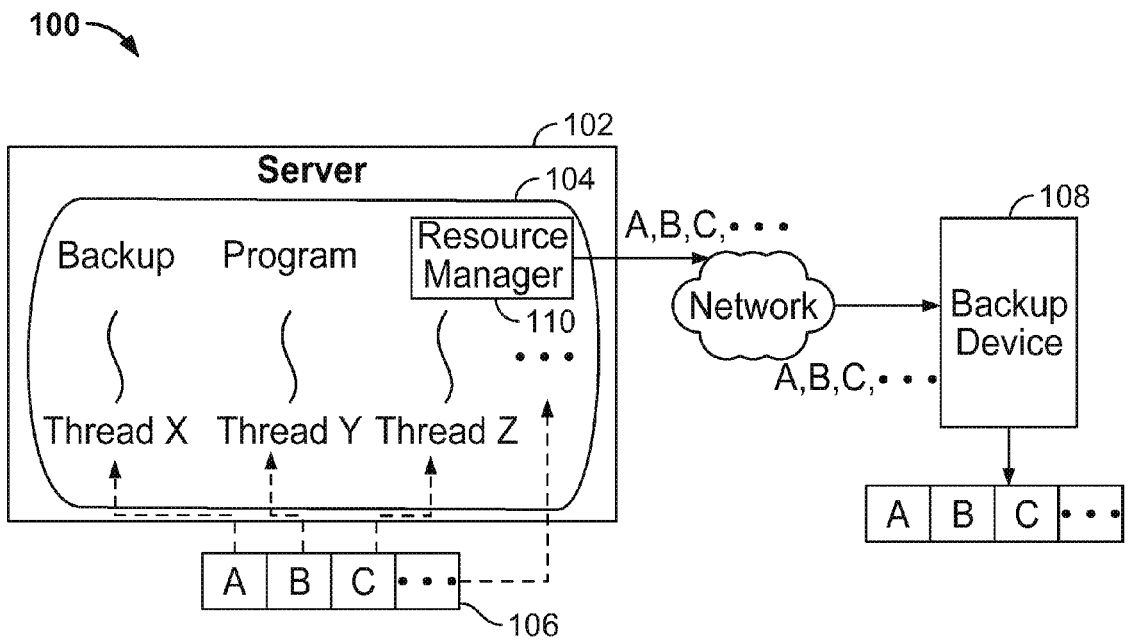
FIG. 1A illustrates an embodiment of a computer system configured to manage access to a shared computer resource.

FIG. 1A illustrates an embodiment of a computer system configured to manage access to a shared computer resource. FIG. 1A illustrates an embodiment of a backup system. In this example, system 100 implements a resource management scheme as described herein. The system includes a server 102 that transfers data over a network to a backup device 108. A backup program 104 executing on server 103 has multiple threads X, Y and Z running in parallel, and in this example each from time to time requires exclusive access to the network communication path shown to ensure data sent by the thread to backup device 108 arrives, and in this example is written to backup media, in the correct order. The threads read data from a data source 106 and transfer the data via the network to the backup device. In the example shown, the threads may simultaneously read different sections of the data source. To guarantee that the receiving end receives the data in sequential order, each thread is required to gain exclusive access of the network when transferring the data. In this example, data transfer is implemented by writing to a network socket. A resource manager 110 controls the threads' access to the socket. Although resource manager 110 is shown as an integral part of program 104 in this example, it is implemented separately from the main program in some embodiments. The threads communicate with the resource manager to gain access the socket and write data to the socket in a specified order (e.g., thread X sends section A first, thread Y sends section B second, etc.).

Figure 1B:
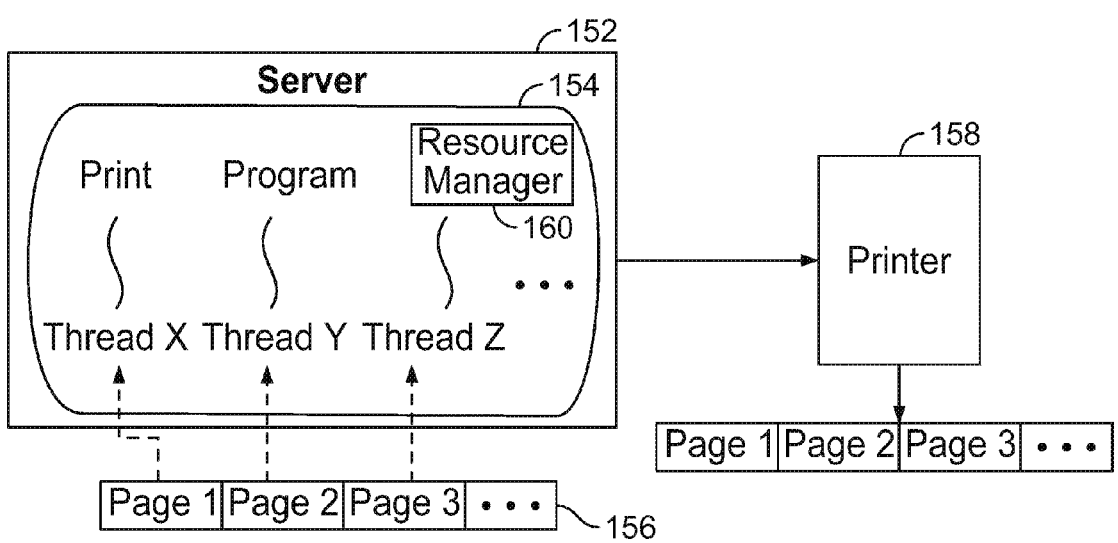
FIG. 1B illustrates an embodiment of a system configured to manage shared access to a printer.

FIG. 1B illustrates an embodiment of a system configured to manage shared access to a printer. In this example, a multithreaded print program 154 operates on server 152. The respective threads read pages of a document 156 simultaneously. The threads communicate with resource manager 160 to share access to a printer 158. The resource manager manages the threads and gives them sequential access to the printer. Each thread occupies the link to the printer exclusively and sends its portion of data to be printed. In this example, sequential access is provided, ensuring the pages are printed in order.

Figure 2:
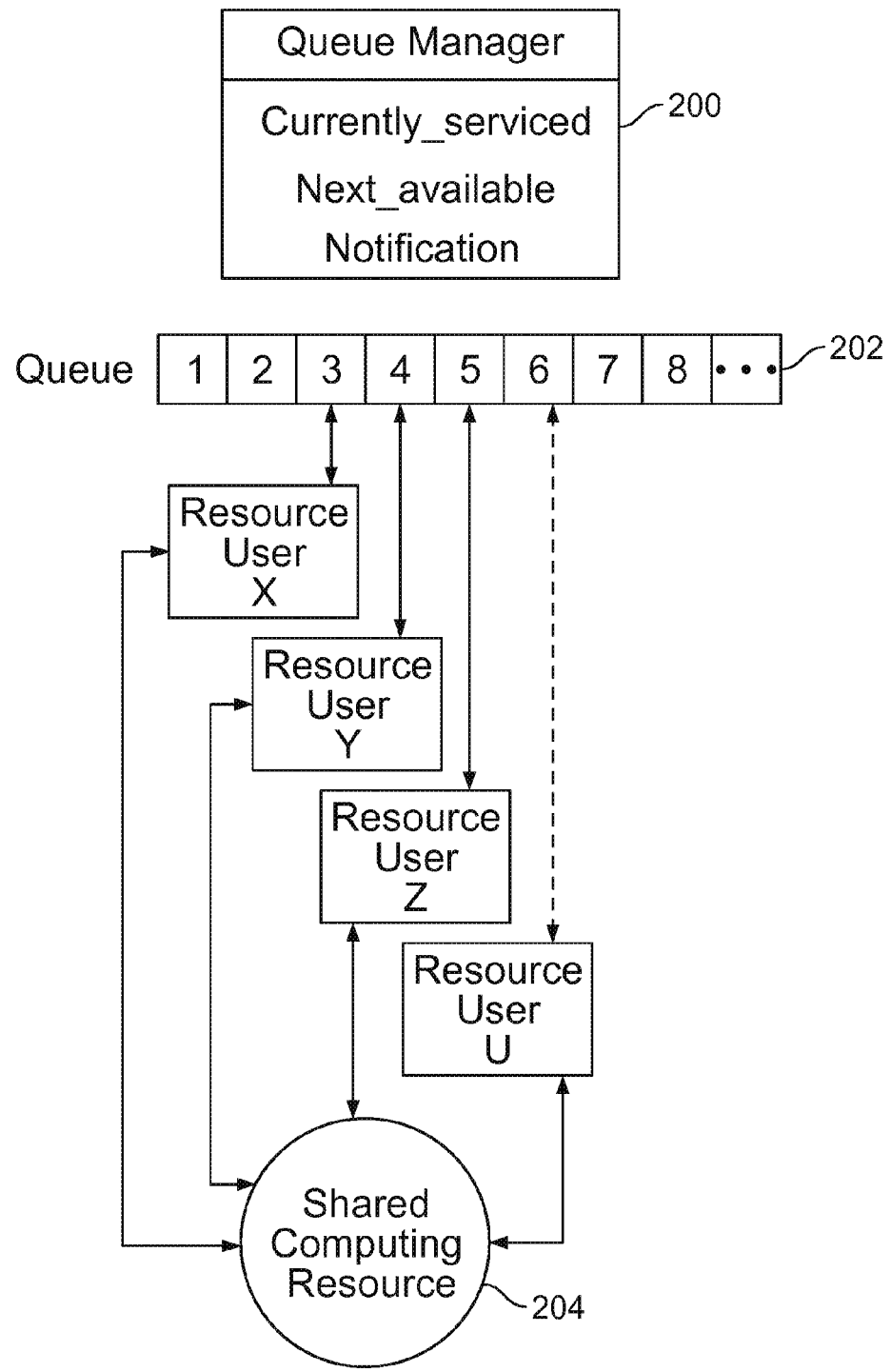
FIG. 2 is a diagram illustrating an embodiment of a data structure used to manage access to a shared computing resource.

FIG. 2 is a diagram illustrating an embodiment of a data structure used to manage access to a shared computing resource. In this example, a queue manager structure 200 is used to facilitate the sharing of a computing resource among resource users. The shared resource 204 may include computing resources, networking resources, data storage, data input/output, or any other appropriate computing resource. For purposes of illustration, the resource users are shown as X, Y, Z, and U in this example. In various embodiments, the resource users can be threads, processes, functions, or any other appropriate requester for the shared resource.

In this example, competing resource users form a queue 202 for maintaining order of access to a shared resource. Each resource user requiring access to the shared resource obtains a place in line. The queue manager data structure 200 provides a way of referencing the resource user that is currently being serviced and providing a way for other resource users to request and be assigned a unique value representing a place in line to use the resource. In this example, the queue manager includes a currently_serviced field in which data indicating the place in the queue that is currently serviced is stored, a next_available field for indicating the next place in the resource queue that is available to be assigned to the next resource user that requests access to the shared resource, and a notification field for notifying the resource users once the shared resource becomes available and the next resource user in line may proceed to access the resource. In some embodiments, the queue manager structure is implemented as a system level primitive or built-in type available to programs written in languages supported by the system. In some embodiments, the queue manager structure is implemented at the application level. In one example, the queue manager is implemented as indicated by the following pseudo-code:

Data struct queue_manager {
Atomic currently_serviced;
Atomic next_available;
Broadcast_signal notification;
} queue_manager For purposes of example, the currently_serviced and the next_available fields comprise alphanumerical values, e.g., successive integers, in various examples throughout this specification. Other types of identifier can be used in other embodiments. In some embodiments, the fields are updated by the resource users during operation. To prevent multiple resource users from simultaneous changing the field values, each of the fields is implemented using an atomic data type that only allows one operation to modify the data at one time. Stated another way, once a resource user begins to modify the value of a field, the operation cannot be interrupted by other resource users. Thus, race conditions that may result in unexpected value changes are prevented.

In some embodiments, for example in the POSIX operating system shown above, the notification field is implemented as a broadcast signal. In some embodiments, for example in the Windows operating system, the notification field is implemented as an event. For purposes of example, the signal implementation is discussed extensively below, although other notification schemes can be used.

Figure 3:
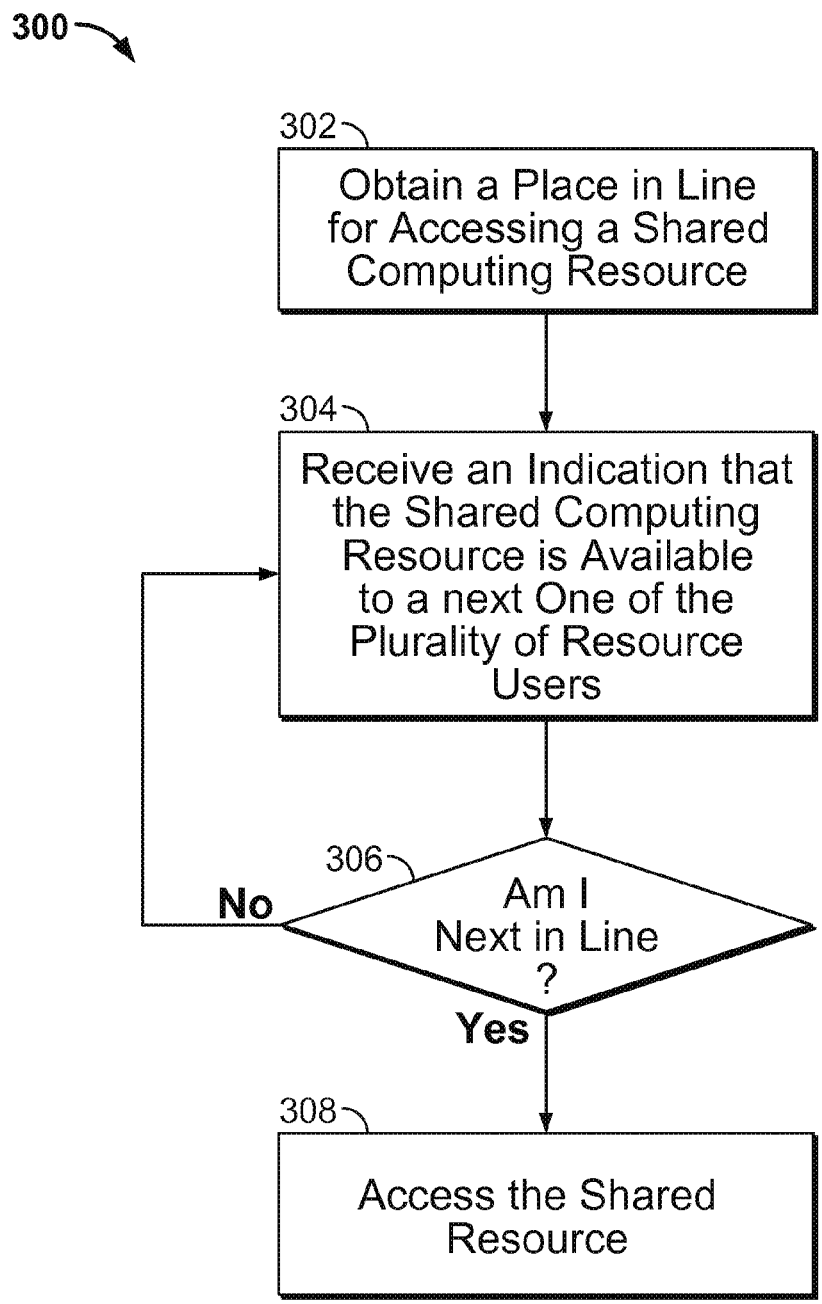
FIG. 3 is a flowchart illustrating an embodiment of a process for managing access to a computing resource shared by a plurality of resource users.

FIG. 3 is a flowchart illustrating an embodiment of a process for managing access to a computing resource shared by a plurality of resource users. Process 300 may be implemented by a resource user waiting to access the resource. In this example, process 300 initiates when a place in line for accessing a shared computing resource is obtained for the resource user (302). At some point, an indication indicating that the shared computing resource is available to a next one of the resource users is received (304). It is determined whether the waiting resource user is the next resource user (306). In the event that the waiting resource user is the next resource user to which the shared resource is available, the shared resource is accessed by the waiting resource user (308). If, however, the waiting resource user is not the next resource user with access to the resource, the waiting resource user will continue to wait until another indication is received (306) and repeat the determination of whether the waiting resource user is the next one to access the shared resource (308).

Process 300 can be illustrated using the data structure and example shown in FIG. 2. Initially, resource users X, Y, and Z are already in the queue, occupying positions 3, 4, and 5. The current state of the resource manager indicates that the currently_serviced field is 3, which means that resource user X is currently being serviced and has exclusive access to the shared resource. The next_available field is 6, which means that position 6 in the queue is open for the next resource user making a new request. The queue manager has the following values:

queue_manager {
currently_serviced=3;
next_available=6;
notification=0;
}

When a new resource user resource user U makes a request for the shared resource, it obtains a place in line (302). In this example, U obtains a place identifier, 6, that corresponds to the sixth position in the queue. The place identifier is globally unique within the program space. In some embodiments, the identifier wraps around to zero when it reaches its maximum value. U will wait for its turn to use the resource. The next_available field is incremented. The queue manager has the following values:

queue_manager {
currently_serviced=3;
next_available=7;
notification=0;
}

Once resource user X completes its operations and releases the resource, the currently_serviced field is incremented and the notification field is set to "1" or some other value to indicate the resource has become available for the next user in line. In some embodiments a broadcast signal is sent to the resource users indicating that the shared resource is available to the next resource user waiting in line. The resource users receive the notification, e.g., by checking (periodically, in response to an event, etc.) the current value of the "notification" field, and each determines by checking the "currently_serviced" field whether it is next in line to use the resource. The queue manager is now:

queue_manager {
currently_serviced=4;
next_available=7;
notification=1;
}

In this example, resource user Y would determine that its queue position, "4", corresponds to the value stored in the "currently_serviced" field. Y would then proceed to access the shared resource, including by setting the notification value (or causing it to be set) back to "0" to indicate the resource is no longer currently available. The queue manager is now:

```
queue_manager {
currently_serviced=4;
next_available=7;
notification=0;
}
```

The process repeats and eventually resource user U will be the one entitled to access the shared resource.

Pseudo code for an embodiment of a process for managing access to a shared resource is shown below. Lines starting with // are comments that do not affect the operations of the code. In this example, the resource users are threads. Each thread will attempt to write to a shared socket (socketA) from the thread's thread buffer (threadBuffer). The write operation has exclusive access to the shared resource until the contents of the thread buffer is written to the socket, without requiring the use of locks.

```
//gQueueManager is a global value
global queue_manager gQueueManager;
//Each thread calls WriteToSocket function to write its buffer content to socket
Call WriteToSocket(threadBuffer);
//WriteToSocket function gives a thread exclusive access to write to socket.
WriteToSocket (threadBuffer) {
//obtain a place in line
myPlaceInLine=GetPlaceInLine( );
//wait until resource is available to this thread
WaitForResource(myPlaceInLine);
//critical section begins. Thread has exclusive access to
   socket in this
//critical section. No operating system lock is needed for
   this critical
//section.
WRITE (socketA, threadBuffer);
// End_critical_section
//Done with resource, release.
ReleaseResource(myPlaceInLine);
RETURN;
}
// GetPlaceInLine function returns to the requesting resource user the next available
//place identifier and updates the next available place identifier.
GetPlaceInLine( ){
//the waiting resource user's place in line is the next_available field of the
//queue manager.
myPlaceInLine=gQueueManager.next_available;
//atomically update the next available position in line. In this example,
//gQueueManager.next_available is incremented.
AtomicUpdateNextAvailable( );
RETURN myPlaceInLine;
}
//ReleaseResource function releases the resource to the resource user that is next in
//the queue ReleaseResource( ){
//atomically update the currently serviced position. In this
   example,
// gQueueManager.currently_serviced is incremented.
AtomicUpdateServiced( );
//send a broadcast signal to all the resource users indicating
   that this thread
//has finished using the shared resource.
BroadcastToResourceUsers( );
RETURN;
}
// WaitForResource function allows a resource user to wait for its turn
WaitForResource (myPlaceInLine) {
WHILE gQueueManager.currently_serviced !=myPlaceInLine;
   WaitForSignal( );
END WHILE
RETURN;
}
//QueueCheck function allows a resource user to check if it is currently allowed
//access to the shared resource. If not, the thread can do something else for the time
//being and check again later, without giving up its place in queue.
QueueCheck (myPlaceInLine) {
if gQueueManager.currently_serviced==myPlaceInLine
   RETURN TRUE;
else RETURN FALSE;
}
```

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of gaining access to a shared computing resource shared by a plurality of resource users, comprising:
   providing a queue manager data structure accessible by the plurality of resource users, wherein the queue manager data structure includes at least a currently serviced resource user data field, a next available data field, and a notification data field;
   obtaining, by a resource user waiting for access to the shared computing resource, a corresponding unique identifier associated with a place in line to use the shared computing resource, wherein the unique identifier is obtained based at least in part on a data value of the next available data field associated with the queue manager data structure, wherein the shared computing resource comprises a network socket to which at least some of the plurality of resource users are configured to gain access to write backup data in a specified order;
   receiving an indication that the shared computing resource has been released by an immediately previous resource user, wherein the indication is based at least in part on an update to a data value of the notification data field and an increase to a data value of the currently serviced resource user data field included in the queue manager data structure by the immediately previous resource user to indicate that the shared computing resource is now available for a next resource user to be serviced; and
   in response to receiving the indication, by a processor, determining whether the resource user waiting for access corresponds to the next resource user to be serviced, wherein the determination includes the resource user waiting for access checking the data value of the currently serviced resource user data field of the queue manager data structure; and
   in the event that the unique identifier corresponds to the data value of the currently serviced resource user data field, accessing the shared computing resource for the resource user waiting for access and updating, by the resource user waiting for access, the data value of the notification data field to indicate that the shared computing resource is no longer currently available, wherein accessing the shared computing resource does not require obtaining a lock.

2. The method as recited in claim 1, wherein the shared computing resource is accessed by no more than one resource user at a time.

3. The method as recited in claim 1, wherein obtaining the corresponding unique identifier associated with the place in line by the resource user waiting for access to the shared computing resource includes obtaining a place indicator.

4. The method as recited in claim 1, wherein accessing the shared computing resource includes executing code in a critical section without using the lock.

5. The method as recited in claim 1, further comprising when finished with using the shared computing resource, releasing the shared computing resource for use by another resource user.

6. The method as recited in claim 5, wherein releasing the shared computing resource for use by another resource user includes incrementing the data value of the currently serviced resource user data field.

7. The method as recited in claim 1, wherein the plurality of resource users includes a plurality of threads and wherein:
- each of the plurality of threads is configured to obtain data and process data;
- the plurality of threads do not obtain data in any predetermined order; and
- the plurality of threads process data in the specified order.

8. The method as recited in claim 1, further comprising incrementing the data value of the next available data field associated with the queue manager data structure by the resource user waiting for access.

9. The method as recited in claim 1, wherein the resource user waiting for access to the shared computing resource is configured to gain access to the network socket subsequent to the immediately previous resource user in the specified order.

10. The method as recited in claim 1, wherein the plurality of resource users includes a plurality of threads and wherein:
- at least some of the plurality of threads are configured to at least partially simultaneously read a plurality of portions of a data source; and
- the specified order is determined based at least in part on a sequential order of the plurality of portions of the data source.

11. A system for obtaining access to a shared computing resource shared by a plurality of resource users, comprising:
- a processor; and
- a memory coupled to the processor and configured to provide to the processor computer instructions for:
- providing a queue manager data structure accessible by the plurality of resource users, wherein the queue manager data structure includes at least a currently serviced resource user data field, a next available data field, and a notification data field;
- obtaining, by a resource user waiting for access to the shared computing resource, a corresponding unique identifier associated with a place in line to use the shared computing resource, wherein the unique identifier is obtained based at least in part on a data value of the next available data field associated with the queue manager data structure, wherein the shared computing resource comprises a network socket to which at least some of the plurality of resource users are configured to gain access to write backup data in a specified order;
- receiving an indication that the shared computing resource has been released by an immediately previous resource user, wherein the indication is based at least in part on an update to a data value of the notification data field and an increase to a data value of the currently serviced resource user data field included in the queue manager data structure by the immediately previous resource user to indicate that the shared computing resource is now available for a next resource user to be serviced; and
- in response to receiving the indication, determining whether the resource user waiting for access corresponds to the next resource user to be serviced, wherein the determination includes the resource user waiting for access checking the data value of the currently serviced resource user data field of the queue manager data structure; and
- in the event that the unique identifier corresponds to the data value of the currently serviced resource user data field, accessing the shared computing resource for the resource user waiting for access and updating, by the resource user waiting for access, the data value of the notification data field to indicate that the shared computing resource is no longer currently available, wherein accessing the shared computing resource does not require obtaining a lock.

12. The system as recited in claim 11, wherein the plurality of resource users includes a plurality of threads and wherein:
- at least some of the plurality of threads are configured to at least partially simultaneously read a plurality of portions of a data source; and
- the specified order is determined based at least in part on a sequential order of the plurality of portions of the data source.

13. A computer program product for obtaining access to a shared computing resource shared by a plurality of resource users, the computer program product being embodied in a non-transitory computer readable storage medium and comprising computer instructions for:
- providing a queue manager data structure accessible by the plurality of resource users, wherein the queue manager data structure includes at least a currently serviced resource user data field, a next available data field, and a notification data field;
- obtaining, by a resource user waiting for access to the shared computing resource, a corresponding unique identifier associated with a place in line to use the shared computing resource, wherein the unique identifier is obtained based at least in part on a data value of the next available data field associated with the queue manager data structure, wherein the shared computing resource comprises a network socket to which at least some of the plurality of resource users are configured to gain access to write backup data in a specified order;
- receiving an indication that the shared computing resource has been released by an immediately previous resource user, wherein the indication is based at least in part on an update to a data value of the notification data field and an increase to a data value of the currently serviced resource user data field included in the queue manager data structure by the immediately previous resource user to indicate that the shared computing resource is now available for a next resource user to be serviced; and
- in response to receiving the indication, determining whether the resource user waiting for access corresponds to the next resource user to be serviced, wherein the determination includes the resource user waiting for access checking the data value of the currently serviced resource user data field of the queue manager data structure; and in the event that the unique identifier corresponds to the data value of the currently serviced resource user data field, accessing the shared computing resource for the resource user waiting for access and updating, by the resource user waiting for access, the data value of the notification data field to indicate that the shared computing resource is no longer currently available, wherein accessing the shared computing resource does not require obtaining a lock.

14. The computer program product as recited in claim 13, wherein the plurality of resource users includes a plurality of threads and wherein:

at least some of the plurality of threads are configured to at least partially simultaneously read a plurality of portions of a data source; and the specified order is determined based at least in part on a sequential order of the plurality of portions of the data source.

15. A system comprising:

a shared computing resource shared by a plurality of resource users; and a processor configured to:

provide a queue manager data structure accessible by the plurality of resource users, wherein the queue manager data structure includes at least a currently serviced resource user data field, a next available data field, and a notification data field;

issue to each of a plurality of waiting resource users waiting to use the shared computing resource a corresponding globally unique place identifier value that represents the resource user's place in line to use the shared computing resource, wherein the unique place identifier is issued based at least in part on a data value of the next available data field associated with the queue manager data structure, wherein the shared computing resource comprises a network socket to which at least some of the plurality of resource users are configured to gain access to write backup data in a specified order;

determine that the shared computing resource has become available based at least in part on an update to a data value of the notification data field and an increase to a data value of the currently serviced resource user data field included in the queue manager data structure by an immediately previous resource user that has released the shared computing resource;

notify at least a next resource user that is next in line to use the shared computing resource that the shared computing resource is available, including sending an indication that the shared computing resource is available, wherein the indication is configured to cause at least the next resource user to check the data value of the currently serviced resource user data field of the queue manager data structure; and determine whether a resource user waiting to use the shared computing resource corresponds to the next resource user that is in line to use the shared computing resource, wherein the determination includes the resource user waiting to use the shared computing resource checking the data value of the currently serviced resource user data field of the queue manager data structure; and in the event that the unique place identifier associated with the resource user waiting to use the shared computing resource corresponds to the data value of the currently serviced resource user data field, access the shared computing resource for the resource user waiting for access and updating, by the resource user waiting for access, the data value of the notification data field to indicate that the shared computing resource is no longer currently available, wherein accessing the shared computing resource does not require obtaining a lock.

16. The system as recited in claim 15, wherein the plurality of resource users includes a plurality of threads and wherein:

at least some of the plurality of threads are configured to at least partially simultaneously read a plurality of portions of a data source; and the specified order is determined based at least in part on a sequential order of the plurality of portions of the data source.

* * * * *